United States Patent [19]
Natali

[11] Patent Number: 5,717,713
[45] Date of Patent: Feb. 10, 1998

[54] TECHNIQUE TO PERMIT RAPID ACQUISITION AND ALERT CHANNEL SIGNALLING FOR BASE STATION-TO-USER LINK OF AN ORTHOGONAL CDMA (OCDMA) COMMUNICATION SYSTEM

[75] Inventor: Francis Natali, Pt. Townsend, Wash.

[73] Assignee: Stanford Telecommunications, Inc., Sunnyvale, Calif.

[21] Appl. No.: 343,974

[22] Filed: Nov. 18, 1994

[51] Int. Cl.[6] .............................. H04B 15/00; H04K 1/00; H04L 27/30
[52] U.S. Cl. .......................... 375/200; 375/206; 375/367; 370/209; 370/342; 370/441
[58] Field of Search .............................. 375/200, 205, 375/206, 208, 367; 380/46; 370/335, 209, 342, 441, 515

[56] References Cited

U.S. PATENT DOCUMENTS

| | | | |
|---|---|---|---|
| 5,260,967 | 11/1993 | Schilling | 375/205 |
| 5,375,140 | 12/1994 | Bustamante et al. | 375/206 |
| 5,383,219 | 1/1995 | Whetley, III et al. | 375/205 |
| 5,410,568 | 4/1995 | Schilling | 370/18 |
| 5,416,797 | 5/1995 | Gilhousen et al. | 375/205 |

*Primary Examiner*—Stephen Chin
*Assistant Examiner*—Don Vo
*Attorney, Agent, or Firm*—Jim Zegeer, Esq.

[57] ABSTRACT

An OCDMA spread spectrum communication system is provided with a PN encoded acquisition channel signal which is free of Radamacher functions. This provides a technique for very rapid acquisition of the PN code and data symbol timing; enables accurate PN chip time tracking with a minimum of power; enables accurate frequency tracking with a minimum of power; provides a technique for accurate signal power measurement at the receiver; enables the receiver to maintain code lock during deep fades; and penetrates into areas of high attenuation for paging or to alert user that he has a call waiting.

10 Claims, 3 Drawing Sheets

TECHNIQUE TO PERMIT RAPID ACQUISITION AND ALERT CHANNEL SIGNALLING FOR BASE STATION-TO-USER LINK OF AN ORTHOGONAL CDMA (OCDMA) COMMUNICATION SYSTEM

REFERENCE TO RELATED APPLICATION

This application is related to application Ser. No. 07/980,957 entitled "WIRELESS DIRECT SEQUENCE SPREAD SPECTRUM DIGITAL CELLULAR TELEPHONE SYSTEM", and a continuation-in-part of application Ser. No. 08/257,324 entitled "WIRELESS DIRECT SEQUENCE SPREAD SPECTRUM DIGITAL CELLULAR TELEPHONE SYSTEM".

BACKGROUND AND BRIEF DESCRIPTION OF THE PRIOR ART

Spread spectrum communications is presently being used for a number of commercial applications and is expected to proliferate as the demand for untethered communications increases.

One example of this art is the IS-95 standard which exists for cellular telephony. In this case, the base station of this star-configured network transmits a set of orthogonal Walsh functions which are overlaid with a pseudo-noise (PN) sequence. Each orthogonal function carries voice or data for a single user. See M. J. E. Golay, IDA Report 108, pg. 110 (1965) which discloses this basic signal format. Also see Magill et al. "Spread-Spectrum Technology for Commercial Applications", IEEE, June 1994.

One difficulty with this type of signal is that the standard noncoherent acquisition technique of stepping the reference code timing in partial-chip increments with respect to the received signal does not work if all Walsh functions are of equal amplitude. This is because the correlated power output remains constant for integer offsets of chip timing. The acquisition problem is solved in IS-95 by transmitting one of the Walsh functions at a considerably higher amplitude than the other signals. The presence of a pilot channel does, of course, reduce the total power available for signaling and also uses one of the available channels.

OBJECTS OF THE INVENTION

The invention is intended to serve several functions. These are summarized as:

1) Provides a means for very rapid acquisition of the PN code and data symbol timing.
2) Enables accurate PN chip time tracking with a minimum of power.
3) Enables accurate frequency tracking with a minimum of power.
4) Provides a means for accurate signal power measurement at the receiver.
5) Enables the receiver to maintain code and frequency tracking during deep fades.
6) Penetrates into areas of high attenuation for paging or to alert user that he has a call waiting.

SUMMARY OF THE INVENTION

The present embodiment applies to the invention as used in a star network. In this case, the hub base station transmits an OCDMA signal to be received by a number of user equipments that may include portable handsets as well as vehicular mobile and fixed units. The invention is particularly useful in satellite systems (due to the importance of minimizing required link margins) but is not limited to them.

The signal, as described in this embodiment, employs BPSK PN modulation and QPSK data modulation. The orthogonal functions are a set of Radamacher-Walsh (R-W) functions. The R-W and PN chips are aligned in time on a one-for-one basis. The R-W function period is equal to one data symbol length, while the PN may be of the same length but may instead be longer. Each R-W function addresses a single user. One R-W function, however, is reserved as a control channel and is monitored by all users when not involved in a active communications. The control channel is used primarily for call set-up purposes. Further, a small percentage (typically 10%) of the data transmitted to a user is devoted to in-band signaling, and is used for control and status. For example, a user involved in a telephone conversation might be receiving 4200 bps of vocoded voice data and 600 bps of in-band control data. The control data might include such items as transmit power, time and frequency corrections, called-party status, and call handover data.

In addition, a PN modulated carrier burst is periodically inserted into the signal in a time division multiplex (TDM) fashion. The R-W functions are turned off during this burst, which increases the effective power by (N-1), where N is the number of orthogonal functions in the R-W set. The PN code is typically a short code that can be received with a matched filter, although this is not necessary. Differentially encoded data is modulo-2 added to the PN code so that a low rate data channel with full transmit power is available to all users. This signal burst (the acquisition channel signal) has the multiple purpose of allowing rapid handset acquisition and providing a robust signal for time and frequency tracking, as well as carrying the "Alert Channel" (AC) data.

DESCRIPTION OF THE DRAWINGS

The above and other objects, advantages, and features of the invention will become more apparent when considered with the following specification and accompanying drawings wherein.

DETAILED DESCRIPTION OF THE INVENTION

It is useful, for the purposes of discussion, to assume some specific parameters for the signal. Assumed parameters are shown in Table 1:

TABLE 1

| Example signal parameters. | |
|---|---|
| Data modulation | QPSK |
| AC modulation | BPSK |
| Information data rate | 4800 bps |
| FEC coding rate | ½ |
| TDM frame period | 20 ms |
| AC data rate | 400 bps |
| Channel symbol rate | 5200 sps |
| Number of orthogonal links | 128 |
| Chip rate | 665.60 kHz |
| AC PN cover code length | 128 chips |
| Data PN cover code length | 1024 |

Figure 1:
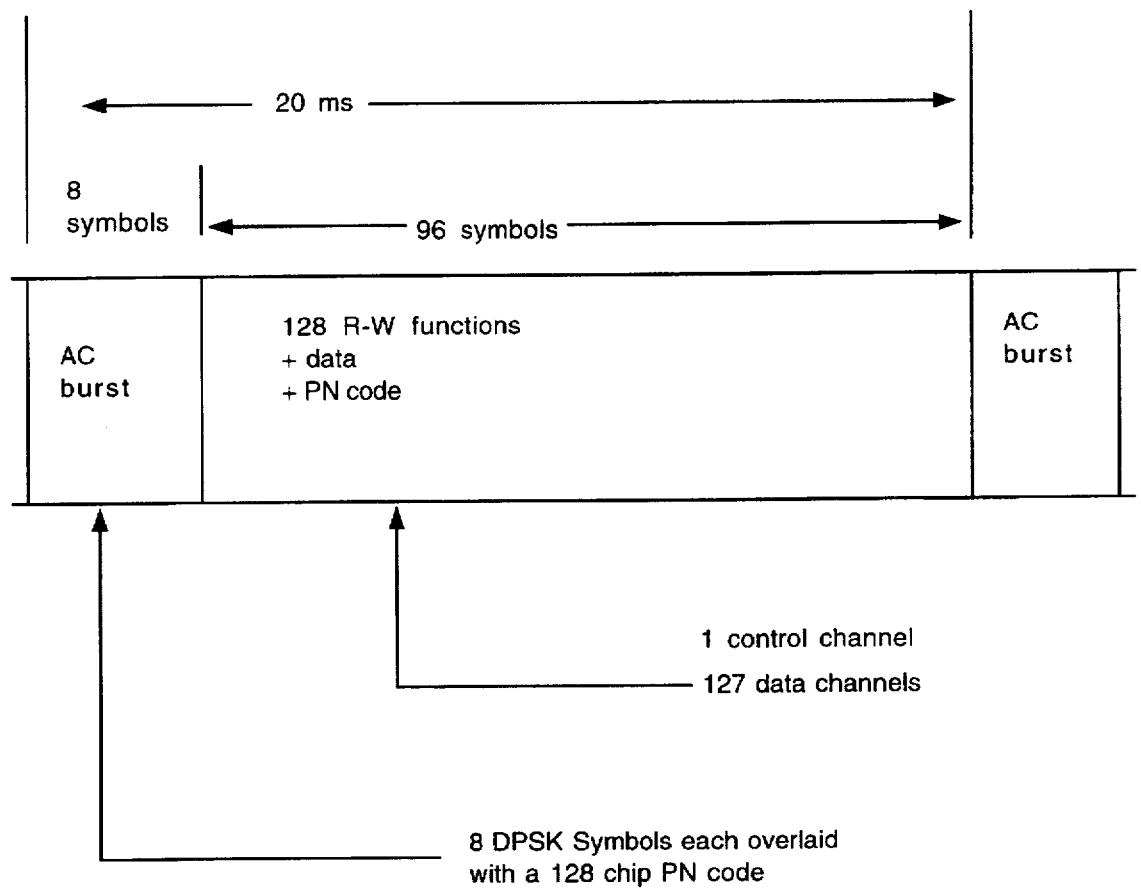
FIG. 1 is a diagrammatic illustration of the out-bound TDM signal structure incorporating the invention.

The TDM structure of the signal is shown in FIG. 1. Note that the R-W modulation is turned off during the AC burst, thereby increasing the C/No ratio by 21 dB. The Eb/No is increased another 3 dB over the data link since the bit period on the AC link is twice as long (the symbol periods on the different links are the same but the AC link uses BPSK compared to QPSK on the data links). If we assume that the data line Eb/No=5 db, then the AC link has an Eb/No=29 dB.

The initial uncertainties in time and frequency at the handset may be large due to Doppler as well as receiver local oscillator instability. Further, system time may be unknown.

The high Eb/No ($\approx$29 dB) of the AC link implies that it can be acquired with high probability using a matched filter. The response of the matched filter is the sinc function with first nulls at the data rate (±5200 Hz). The two-sided 3 dB bandwidth of this filter is approximately 4600 Hz, implying the possible need to search several frequency bins. The AC burst repeats every 20 ms, during which time one frequency bin can be examined with a single matched filter. Once the burst is detected, frequency can be accurately estimated over the 1.5 ms duration using a cross product estimator.

Detection of the AC burst gives an estimate of symbol timing as well as a coarse estimate of chip timing. Chip time tracking can be implemented by using a time-gated delay lock loop that only tracks on the AC burst. Frequency tracking is performed using a time-gated AFC loop. Once time tracking has begun, the receiver can demodulate voice data.

THE ALERT CHANNEL

As noted above, 8 bits of AC data are transmitted every channel frame (20 ms). This data can be demodulated as soon as frequency and time tracking has been established. The output of the MF is sampled at the eight correlation peaks which occur during the AC burst. These samples are then differentially detected. This is a very rapid acquisition and robust channel for several reasons. First, the use of a PN matched filter eliminates the need for a time search of the PN code phase. This is usually the major contributor to acquisition time in CDMA systems. Further, all R-W function modulation is inhibited during the AC burst, resulting in a very high link margin (close to 20 dB). Thus the signal can be received even in unfavorable circumstances where high propagation attenuation is experienced. The AC data rate is 400 bps.

The call ringing signal is transmitted to the user on the control channel as discussed above. However, users in an unfavorable propagation location, such as inside a building, may not be able to receive this signal due to insufficient link margin. In this case, the user address would be transmitted on the Alert Channel. This could serve as a paging channel in which case the user would receive data such as the caller's number or message. Likewise, it could simply alert the user that a call is waiting. He is then expected to move to a more favorable location (perhaps by a window) where he can receive the control channel for call set-up.

Typically, the AC channel data would be formatted into frames. The frame would begin with a frame sync word, such as a Barker sequence, followed by the ID's of users with calls waiting.

TRANSMITTER IMPLEMENTATION

Figure 2:
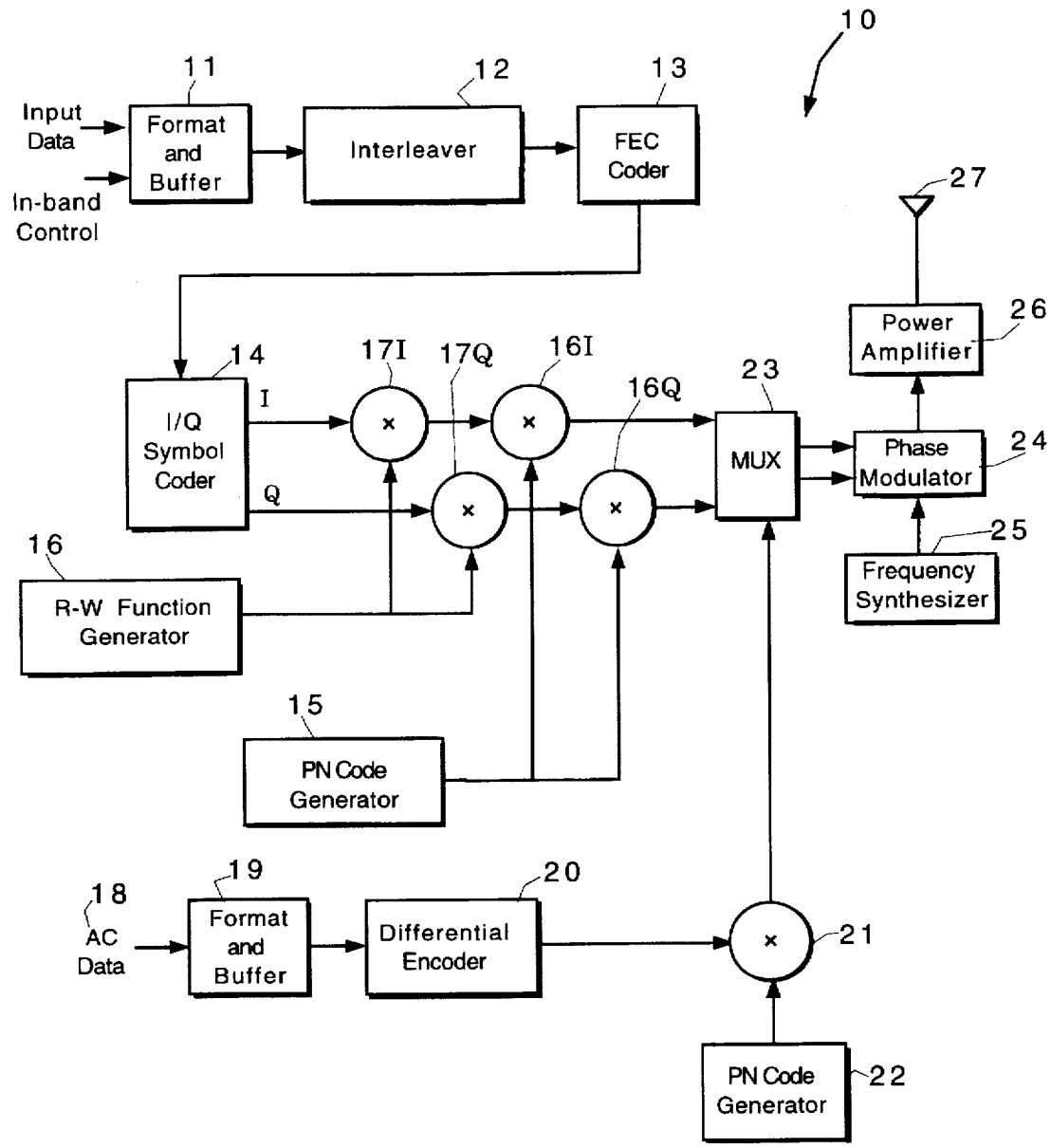
FIG. 2 is a functional block diagram of the transmitter.

A functional block diagram of the signal transmitter 10 is shown in FIG. 2. The input data is formatted 11, interleaved 12, coded 13, and I/Q symbols 14 formed in the usual manner. These symbols are overlaid with the PN code 15 by correlator 16I, 16Q, as well as the appropriate R-W function 16 by correlators 17I, 17Q. Similarly, the Ac data 18 is formatted 19 and differentially encoded 20. This data is overlaid in correlator 21 with a time synchronous PN code 22 whose period is equal to a data symbol. The two baseband signals are time multiplexed 23 to produce the novel signal structure shown in FIG. 1, and then phase modulated 24 onto a carrier of appropriate frequency from synthesizer or carrier frequency source 25, power amplified 26 and broadcast by antenna 27.

RECEIVER IMPLEMENTATION

Figure 3:
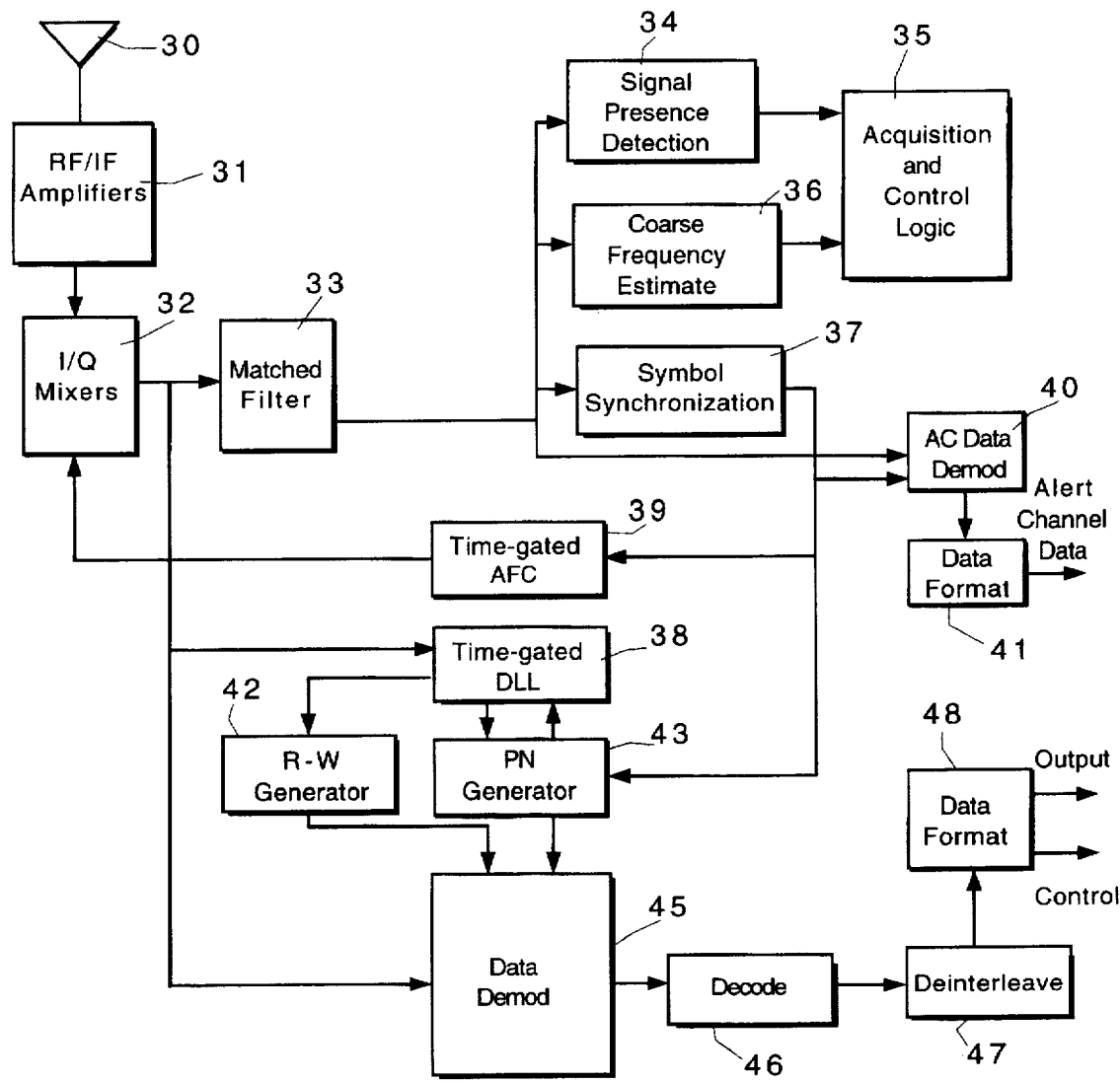
FIG. 3 is a functional block diagram of a user receiver.

A functional block diagram of the user receiver is shown in FIG. 3. The received signal received by antenna 30 is amplified 31 and down converted to baseband using in-phase (I) and quadrature (Q) mixers 32 in a conventional fashion. The signal is then routed to a digital matched filter 33. The output of the filter 33 is monitored for correlation peaks 34 that indicate signal presence. If the receiver is tuned to the proper frequency, an AC burst (which exhibits eight correlation peaks, one for each data bit) should be detected by the Signal Presence Detector 34 within 20 ms. If no detection occurs, the receiver is stepped to the next frequency search bin by the Acquisition and Control Logic 35 (a parallel frequency search could, of course, be implemented with parallel MF's 33 matched to the various frequency search bins). The receiver keeps searching until the signal is detected.

Once the signal is detected, the receiver begins to time track the PN code associated with the AC burst. The coarse timing and ambiguity resolution 36 is performed with a Symbol Synchronizer 37, which detects the correlation peaks and determines which is the first pulse in each group of eight. The "fine" time tracking is performed by a time-gated Delay-Lock Loop (DLL) 38. Frequency tracking is achieved by enabling a time-gated AFC loop 39 which also operates on the AC burst.

Note that in the process described so far, only the AC burst signal (FIG. 1) has been used. In unfavorable locations this is likely to be the only signal received since it may have over 20 dB more margin than the data links (depending on the type of data link coding employed). The AC data is easily demodulated by differential detection 40 of the MF 33 output correlation peak samples and the alert channel data formatted 41 outputted to a utilization device (not shown).

The R-W Function Generator 42 is time synchronous with the PN Generator 43 so that once PN code tracking is established, the R-W Generator 42 is also synchronized. The incoming signal is multiplied by the time synchronized PN code and appropriate R-W function leaving a QPSK modulated data signal which can then be demodulated 45, decoded 46, deinterleaved 47, and formatted in the conventional manner and data and control signals outputted to a utilization device (not shown).

Key features of the invention include the following:

The base station of a star-configured network transmits a set of orthogonal Walsh functions which are overlaid with a pseudo-noise (PN) sequence (called orthogonal CDMA or OCDMA). Each orthogonal function carries voice or data for a single user. A carrier burst modulated by a short PN code is time division multiplexed (TDM) with the OCDMA signal. This allows rapid timing acquisition, which is considered essential for a personal communication system with large initial time and frequency uncertainties.

The time division multiplexing (TDM) of a carrier burst modulated by a short PN code with an OCDMA signal allows accurate tacking of the code phase and carrier frequency with a minimum of signal power.

The time division multiplexing (TDM) of a carrier burst modulated by a short PN code with an OCDMA signal allows the receiver to maintain accurate tracking of the code phase and carrier frequency in the presence of deep fades, thereby reducing occurrences of loss-of-lock and signal reacquisition.

The time division multiplexed (TDM) carrier burst is modulated by a short PN code as well differentially encoded binary data. The binary data is time synchronous with the PN code. The base station transmits data, such as a "call-waiting" alert, on this channel to users in unfavorable locations. This channel has a much higher link margin than the traffic channels.

It will be appreciated that there has been shown and described preferred embodiments of the invention and it will be appreciated that various other embodiments, modifications and adaptations of the invention will become readily apparent to those skilled in the art. It is intended that such other obvious adaptations and modifications be incorporated within the true spirit and scope of the claims appended hereto.

What is claimed is:

1. In a spread spectrum communication system in which a set of orthogonal Radamacher-Walsh (RW) functions are overlaid with a pseudo-noise (PN) sequence and an information signal to form an orthogonal code division multiple access (OCDMA) transmit signal, each orthogonal function of said set carries voice or data for a single user in said system, a source of RF carrier, and means to phase modulate said OCDMA transmit signal onto said RF carrier, the improvement comprising:

means to provide a time division multiplex (TDM) acquisition signal comprised of a carrier burst modulated by a short PN code which is free of all orthogonal Radamacher-Walsh (RW) functions and multiplexer means for combining said TDM acquisition signal with said OCDMA transmit signal for phase modulation on said RF carrier including receiver means for receiving said RF carrier, means to down-convert to baseband and detecting the presence of said TDM acquisition signal, and upon detection of said acquisition signal, tracking the PN code carried by said TDM acquisition signal, including symbol synchronizer means for detecting correlation peaks and determining which is the first pulse in a group thereof.

2. The spread spectrum communication system defined in claim 1 including time-gated delay lock loop means for "fine" time tracking of said PN and Walsh signal.

3. In a spread spectrum communication system in which a set of orthogonal Radamacher-Walsh (RW) functions are overlaid with a pseudo-noise (PN) sequence and an information signal to form an orthogonal code division multiple access (OCDMA) transmit signal, each orthogonal function of said set carries voice or data for a single user in said system, a source of RF carrier, and means to phase modulate said OCDMA transmit signal onto said RF carrier, the improvement comprising:

means to provide a time division multiplex (TDM) acquisition signal comprised of a carrier burst modulated by a short PN code which is free of all orthogonal Radamacher-Walsh (RW) functions and multiplexer means for combining said TDM acquisition signal with said OCDMA transmit signal for phase modulation on said RF carrier.

4. The spread spectrum communication system defined in claim 3 wherein said means to provide a TDM acquisition signal, includes a source of acquisition signal symbols, means to PN code said acquisition signal symbols and time division multiplexing means for time division multiplexing said acquisition signal with said OCDMA transmit signal for phase modulation onto said carrier.

5. The spread spectrum communication system defined in claim 3, including receiver means for receiving said RF carrier, means to down-convert to baseband and detecting the presence of said TDM acquisition signal, and upon detection of said acquisition signal, tracking the PN code carried by said TDM acquisition signal.

6. The spread spectrum communication system defined in claim 5 including symbol synchronizer means for detecting correlation peaks and determining which is the first pulse in a group thereof.

7. The spread spectrum communication system defined in claim 6 including time-gated delay lock loop means for "fine" time tracking of said PN and Walsh signal.

8. The spread spectrum communication system defined in claim 7 wherein said Radamacher-Walsh (RW) function is caused to be time synchronous with said PN function so that once PN code tracking is established, the Radamacher-Walsh (RW) functions are also synchronized.

9. A receiver in a spread spectrum communication system in which a set of orthogonal Radamacher-Walsh (RW) functions are overlaid with a pseudo-noise (PN) sequence and an information signal to form a transmit signal, each orthogonal function of said set carries voice or data for a single user in said system, a source of RF carriers, means to provide an acquisition signal comprised of a carrier burst modulated by a short PN code which is free of all Radamacher-Walsh (RW) functions, and means to phase modulate said transmit signal onto said RF carrier, said receiver including means to detect the presence of said acquisition signal and upon detecting the presence of said acquisition signal, tracking the PN code carried thereby.

10. A method of rapidly acquiring timing acquisition in an orthogonal code division multiple access (OCDMA) communication system in which time division multiplexed frames of data overlaid with orthogonal function and a PN code to form a first base band signal, comprising providing an acquisition data signal and PN coding said acquisition data signal only with a second PN code and free of all orthogonal functions to form a second baseband signal time multiplexing said first and second baseband signals on a carrier signal having a predetermined frequency, to form a broadcast signal for broadcasting, and broadcasting said broadcast signal, recovering said broadcast signal and down-converting said broadcast signal to baseband, detecting said acquisition data signal, and upon detection of said acquisition data signal, time tracking said second PN code.

* * * * *